United States Patent
Narita (10) Patent No.: US 12,197,794 B2
(45) Date of Patent: Jan. 14, 2025

(54) COMPUTER-READABLE STORAGE MEDIUM, INFORMATION PROCESSING DEVICE, AND METHOD FOR PRINTING COMPOSITE IMAGE

(71) Applicant: BROTHER KOGYO KABUSHIKI KAISHA, Nagoya (JP)

(72) Inventor: Kenju Narita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/347,037

(22) Filed: Jul. 5, 2023

(65) Prior Publication Data
US 2023/0350613 A1 Nov. 2, 2023

Related U.S. Application Data

(63) Continuation of application No. PCT/JP2022/001535, filed on Jan. 18, 2022.

(30) Foreign Application Priority Data

Jan. 26, 2021 (JP) ................................. 2021-010570

(51) Int. Cl.
*G06F 3/12* (2006.01)

(52) U.S. Cl.
CPC .......... *G06F 3/1208* (2013.01); *G06F 3/1223* (2013.01)

(58) Field of Classification Search
None
See application file for complete search history.

(56) References Cited

U.S. PATENT DOCUMENTS

2008/0080000 A1* 4/2008 Kadota ............. G06K 15/1822
358/1.15
2008/0259388 A1* 10/2008 Sawaguchi ........ H04N 1/00962
358/1.15
(Continued)

FOREIGN PATENT DOCUMENTS

JP 2008152668 A 7/2008
JP 2009076049 A 4/2009
(Continued)

OTHER PUBLICATIONS

International Preliminary Report on Patentability and Written opinion dated Jul. 31, 2023 issued in PCT/JP2022/001535 together with English language translations.
(Continued)

*Primary Examiner* — Henok Shiferaw
(74) *Attorney, Agent, or Firm* — Scully, Scott, Murphy & Presser, P.C.

(57) ABSTRACT

A non-transitory computer-readable storage medium stores computer-readable instructions that are executable by a computer of an information processing device and conform to a printer connected with the information processing device. The instructions cause, when executed, the information processing device to obtain, from an external device, image information indicating an image for composition registered in the external device, and cause a user interface to display the obtained image information. The instructions further cause, when executed, the information processing device to perform a printing process to cause the printer to print a composite image in which the image for composition indicated by the obtained image information is combined with a target image to be printed, in response to a print instruction with a print setting for image composition being output from an application program to a general-purpose
(Continued)

print program incorporated in advance in an operating system of the information processing device.

13 Claims, 7 Drawing Sheets

(56) References Cited

U.S. PATENT DOCUMENTS

| | | | |
|---|---|---|---|
| 2009/0059278 A1 | 3/2009 | Fukunishi | |
| 2013/0063742 A1* | 3/2013 | Kikuchi | G06F 3/1253 |
| | | | 358/1.11 |
| 2017/0223210 A1* | 8/2017 | Yamada | B41J 13/0009 |
| 2019/0138257 A1* | 5/2019 | Kubota | G06F 3/1274 |
| 2020/0110559 A1 | 4/2020 | Natori | |
| 2020/0249881 A1* | 8/2020 | Hosomizo | G06F 3/1232 |
| 2020/0249882 A1* | 8/2020 | Yamada | G06F 3/1244 |
| 2020/0310708 A1* | 10/2020 | Hosomizo | G06F 3/1208 |
| 2020/0310717 A1* | 10/2020 | Yamada | G06F 3/1256 |
| 2021/0117135 A1 | 4/2021 | Suzuki | |
| 2021/0152712 A1* | 5/2021 | Yamada | G06F 3/1206 |
| 2023/0350617 A1* | 11/2023 | Narita | G06F 3/1242 |

FOREIGN PATENT DOCUMENTS

| | | |
|---|---|---|
| JP | 2011193097 A | 9/2011 |
| JP | 2015049580 A | 3/2015 |
| JP | 2020004254 A | 1/2020 |
| JP | 2020060849 A | 4/2020 |
| JP | 2020166350 A | 10/2020 |
| JP | 2020166433 A | 10/2020 |

OTHER PUBLICATIONS

International Search Report dated Apr. 19, 2022 issued in PCT/JP2022/001535.
Notice of Reasons for Refusal dated Aug. 6, 2024 received in Japanese Patent Application No. 2021-010570.
Notice of Reasons for Refusal dated Nov. 26, 2024 received in Japanese Patent Application No. 2021-010570.

* cited by examiner

COMPUTER-READABLE STORAGE MEDIUM, INFORMATION PROCESSING DEVICE, AND METHOD FOR PRINTING COMPOSITE IMAGE

REFERENCE TO RELATED APPLICATIONS

This application is a continuation of PCT International Application No. PCT/JP2022/001535 filed on Jan. 18, 2022, and claims priority from Japanese Patent Application No. 2021-010570 filed on Jan. 26, 2021, which is incorporated herein by reference in its entirety.

BACKGROUND ART

As a technology to control a printer from an information processing device such as a personal computer, a configuration has been known in which the information processing device generates print data by a printer driver, and displays a preview image of the generated print data before sending the print data to the printer. Further, as a technology for the printer driver, a technology to generate a composite image in which an image for composition (e.g., a watermark or a stamp) is combined with a target image to be printed has been known.

DESCRIPTION

In recent years, a technology has been put to practical use in which a printer is controlled by a print program that is incorporated as standard into an operating system (hereinafter referred to as an "OS") of an information processing device, without using a printer driver as described above. In this technology, the OS associates the printer with the OS-standard print program, and thereafter, the information processing device is enabled to cause the printer to perform printing with the OS-standard print program without using a printer driver in response to receiving a print instruction to the printer.

However, the aforementioned OS-standard general-purpose print program does not have a function to receive an image for composition. Therefore, the information processing device is unable to check the image for composition, and is further unable to cause the printer to print a composite image in which the image for composition is combined with a target image to be printed.

Aspects of the present disclosure are advantageous for providing one or more improved techniques for an information processing device, into which an OS-standard general-purpose print program is incorporated, to cause a printer to print a composite image.

According to aspects of the present disclosure, a non-transitory computer-readable storage medium is provided, which stores computer-readable instructions that are executable by a computer of an information processing device and conform to a printer connected with the information processing device. The instructions are configured to, when executed by the computer, cause the information processing device to obtain image information from an external device connected with the information processing device, the image information indicating an image for composition registered in the external device. The instructions are further configured to, when executed by the computer, cause the information processing device to cause a user interface of the information processing device to display the obtained image information. The instructions are further configured to, when executed by the computer, cause the information processing device to perform a printing process to cause the printer to print a composite image in response to a print instruction with a print setting for image composition being output from an application program to a general-purpose print program. The composite image is an image in which the image for composition indicated by the obtained image information is combined with a target image to be printed. The application program is incorporated in the information processing device. The general-purpose print program is incorporated in advance in an operating system of the information processing device.

According to aspects of the present disclosure, further provided is an information processing device including a user interface and a controller. The controller includes a processor and a non-transitory computer-readable storage medium. The non-transitory computer-readable storage medium stores an application program, a general-purpose print program, and computer-readable instructions. The general-purpose print program is incorporated in advance in an operating system of the information processing device. The instructions conform to a printer connected with the information processing device. The instructions are configured to, when executed by the processor, cause the controller to obtain image information from an external device connected with the information processing device. The image information indicates an image for composition registered in the external device. The instructions are further configured to, when executed by the processor, cause the controller to cause the user interface to display the obtained image information. The instructions are further configured to, when executed by the processor, cause the controller to perform a printing process to cause the printer to print a composite image in response to a print instruction with a print setting for image composition being output from the application program to the general-purpose print program. The composite image is an image in which the image for composition indicated by the obtained image information is combined with a target image to be printed.

According to aspects of the present disclosure, further provided is a method implementable by a processor executing computer-readable instructions on an information processing device. The instructions conform to a printer connected with the information processing device. The method includes obtaining image information from an external device connected with the information processing device. The image information indicates an image for composition registered in the external device. The method further includes causing a user interface of the information processing device to display the obtained image information. The method further includes performing a printing process to cause the printer to print a composite image in response to a print instruction with a print setting for image composition being output from an application program to a general-purpose print program. The composite image is an image in which the image for composition indicated by the obtained image information is combined with a target image to be printed. The application program is incorporated in the information processing device. The general-purpose print program is incorporated in advance in an operating system of the information processing device.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A detailed explanation will be provided below of a personal computer (hereinafter referred to as a "PC") using a support program in an illustrative embodiment according to aspects of the present disclosure, with reference to the accompanying drawings. In the present disclosure, a support program executable by the PC connected with a printer having a printing function is described.

Figure 1:
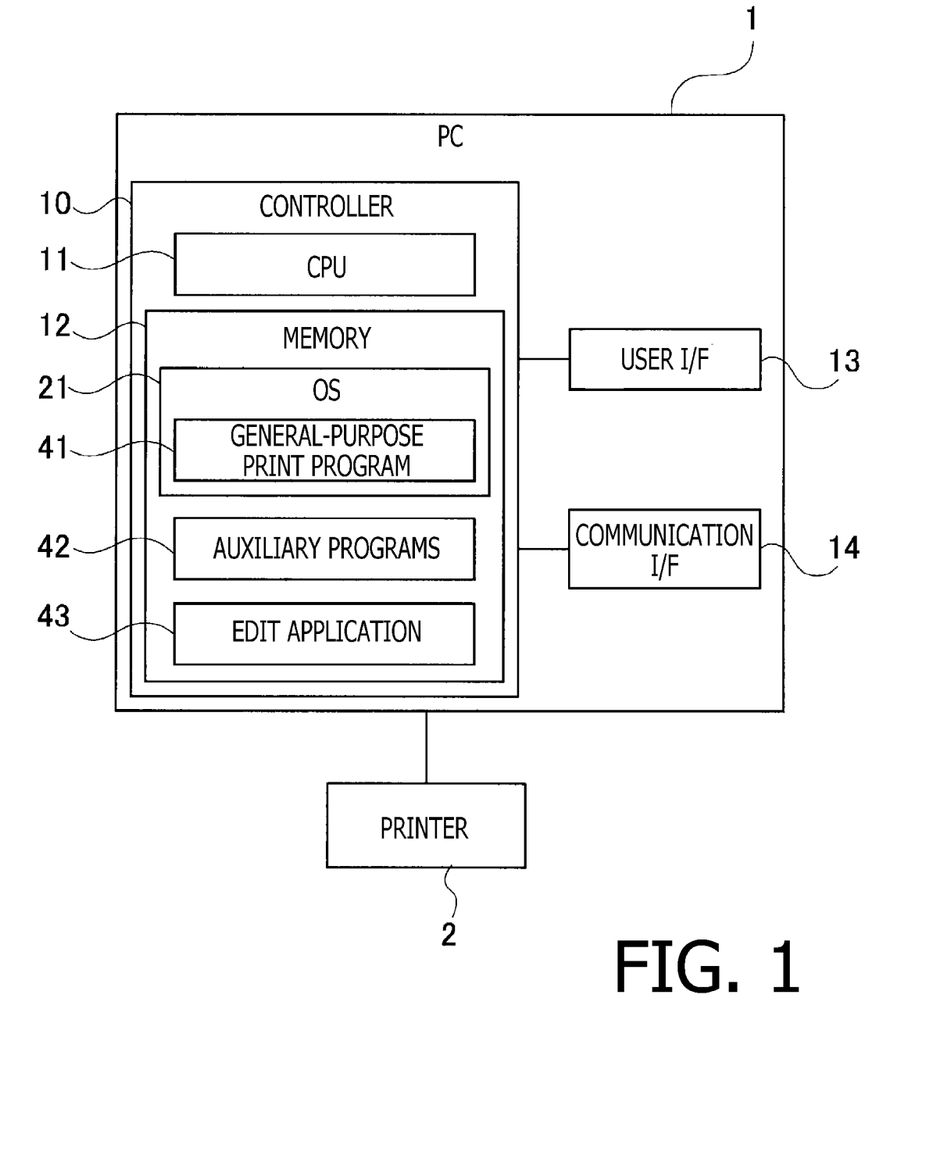
FIG. 1 is a block diagram schematically showing an electrical configuration of a PC.

As shown in FIG. 1, a PC 1 of the illustrative embodiment has a controller 10 that includes a CPU 11 and a memory 12. The PC 1 may be an example of an "information processing device" according to aspects of the present disclosure. The CPU 11 may be an example of a "processor" according to aspects of the present disclosure. The PC 1 further includes a user interface (hereinafter referred to as a "user I/F") 13 and a communication interface (hereinafter referred to as a "communication I/F") 14, which are electrically connected with the controller 10. The controller 10 shown in FIG. 1 is a collective term for hardware and software used to control the PC 1, and may not necessarily represent a single hardware element actually existing in the PC 1.

The CPU 11 is configured to perform various processes according to programs read from the memory 12 and based on user operations. The memory 12 stores various types of data and various programs including various application programs (hereinafter, which may be referred to as "applications"). The memory 12 is also used as a work area when various processes are performed. A buffer provided to the CPU 11 may be an example of a "memory" according to aspects of the present disclosure. Examples of the memory 12 are not limited to ROMs, RAMS, or HDDs, but may include storage media (e.g., CD-ROMs and DVD-ROMs) that are readable and writable by the CPU 11.

The user I/F 13 includes hardware configured to display screens to provide information to the user, and hardware configured to receive user operations. The user I/F 13 may have a combination of a display configured to display information, and a mouse and a keyboard that are configured to receive user input operations. The user I/F 13 may include a touch panel configured to display information and receive user input operations.

The communication I/F 14 includes hardware configured to communicate with external devices such as a printer 2. Communication standards applicable for the communication I/F 14 include Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may have a plurality of communication I/Fs 14 conforming to a plurality of communication standards.

As shown in FIG. 1, the memory 12 of the PC 1 stores an operating system (hereinafter referred to as an "OS") 21 including a general-purpose print program 41, and further stores auxiliary programs 42 and an edit application 43. The auxiliary programs 42 may be included in examples of a "support program" according to aspects of the present disclosure. The edit application 43 may be an example of an "application program" according to aspects of the present disclosure. Examples of the OS 21 may include Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The general-purpose print program 41 is an OS-standard program for causing various types of printers (e.g., the printer 2) to perform printing based on user instructions. The general-purpose print program 41 in the illustrative embodiment is a program having a function to generate intermediate image data based on image data to be printed.

The general-purpose print program 41 supports functions that are usable in common by a plurality of models of printers provided by a vendor of the various types of printers. The general-purpose print program 41 does not support all of the specific functions of the various types of printers. Functions supportable by the general-purpose print program 41 are limited to generic functions.

The auxiliary programs 42 include one program or a group of programs configured to, when executed by the CPU 11, cause the PC 1 to perform processing based on instructions from the OS 21, accompanying processing by the general-purpose print program 41. The auxiliary programs 42 include one or more applications that support control of a target hardware element. The auxiliary programs 42 in the illustrative embodiment conform to a model of the printer 2 connected with the PC 1. The auxiliary programs 42 are launched from the general-purpose print program 41, for instance, when the PC 1 has received an instruction to cause the printer 2 to perform printing using the general-purpose print program 41. For instance, the auxiliary programs 42 may be referred to as hardware support applications (abbreviation: HSAs).

The auxiliary programs 42 are configured to, when executed by the CPU 11, cause the PC 1 to accept a plurality of types of instructions from the general-purpose print program 41 and perform various types of processes based on the accepted instructions. The auxiliary programs 42 may include a combination of a plurality of programs each of which is configured to, when executed by the CPU 11, cause the PC 1 to accept execution instructions. The auxiliary programs 42 may include one program configured to, when executed by the CPU 11, cause the PC 1 to accept instructions and perform respective different processes according to the accepted instructions.

The auxiliary programs 42 may include a program prepared for each type of printer by the vendor of the various types of printers. For instance, the auxiliary programs 42 may include an auxiliary program prepared for inkjet printers and an auxiliary program prepared for laser printers. For instance, when a new printer is connected with the PC 1, the OS 21 causes the PC 1 to download an appropriate auxiliary program from a server or another source depending on a type of the connected printer and to incorporate the downloaded auxiliary program into the PC 1. The OS 21 then causes the PC 1 to store identification information of the incorporated auxiliary program in the memory 12 in association with printer information of the newly connected printer. It is noted that the auxiliary programs 42 may include not only the auxiliary program prepared for each type of printer but also an auxiliary program prepared for each model of printer or an auxiliary program prepared for each series of models of printers.

The edit application 43 is, for instance, an application for creating and editing image data and document data. For instance, the edit application 43 may be Microsoft Word or Microsoft PowerPoint, or may be an application provided by the vendor of the printer 2. "Microsoft" is a registered trademark of Microsoft Corporation. "PowerPoint" is a registered trademark of Microsoft Corporation. The edit application 43 is configured to accept user operations that include instructions to cause the printer 2 to perform particular operations. Specifically, for instance, the edit application 43 is configured to, when executed by the CPU 11, cause the PC 1 to accept, via the user I/F 13, a print execution instruction to cause the printer 2 to perform printing.

The printer 2 in the illustrative embodiment is a device having a printing function. The PC 1 is communicably connected with the printer 2 via the communication I/F 14. The printer 2 is configured to receive print data, for instance, from the PC 1 and perform printing based on the received print data.

Figure 2A:
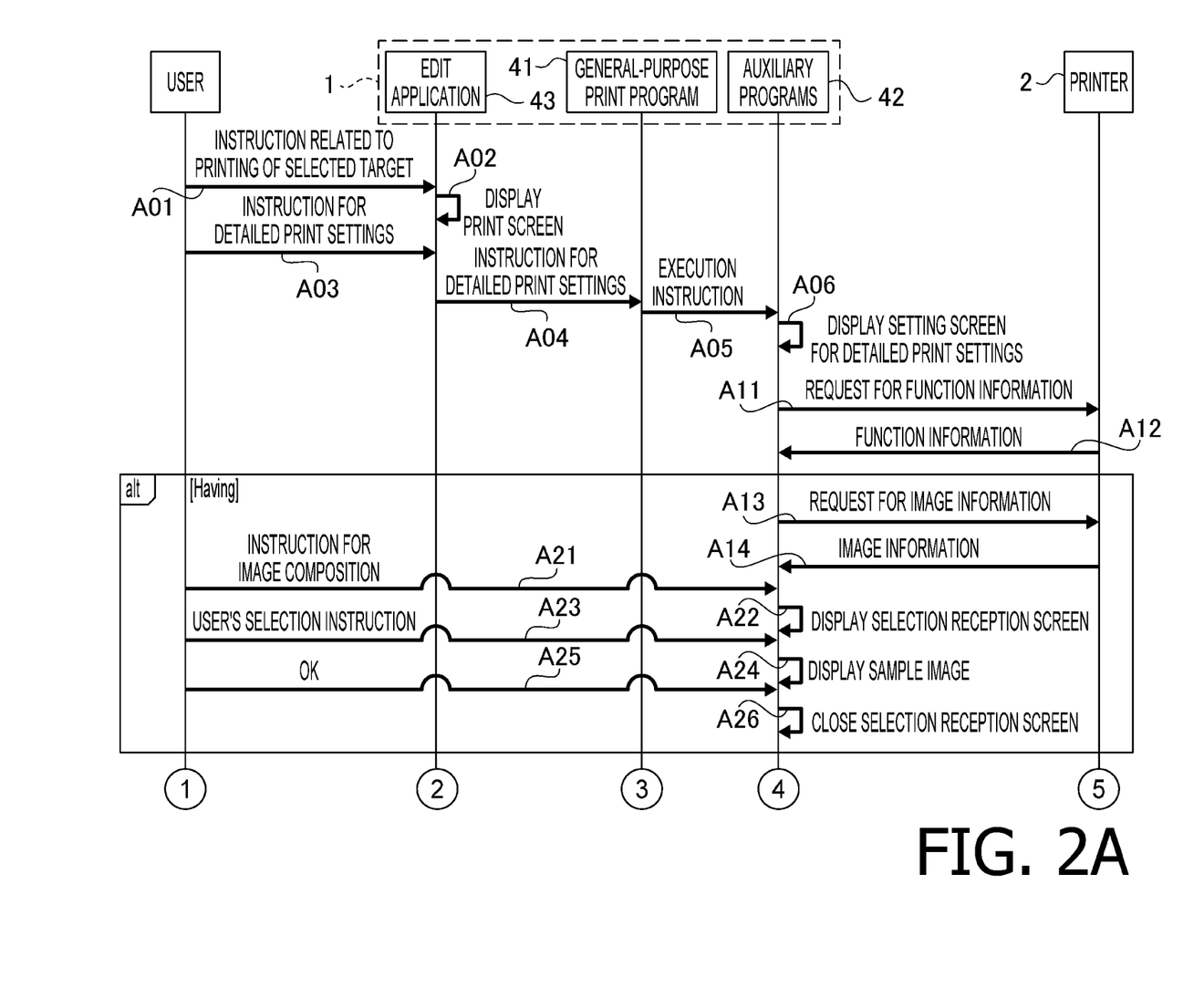
FIGS. 2A and 2B are sequence charts showing an example procedure of printing operations by individual programs.
Figure 2B:
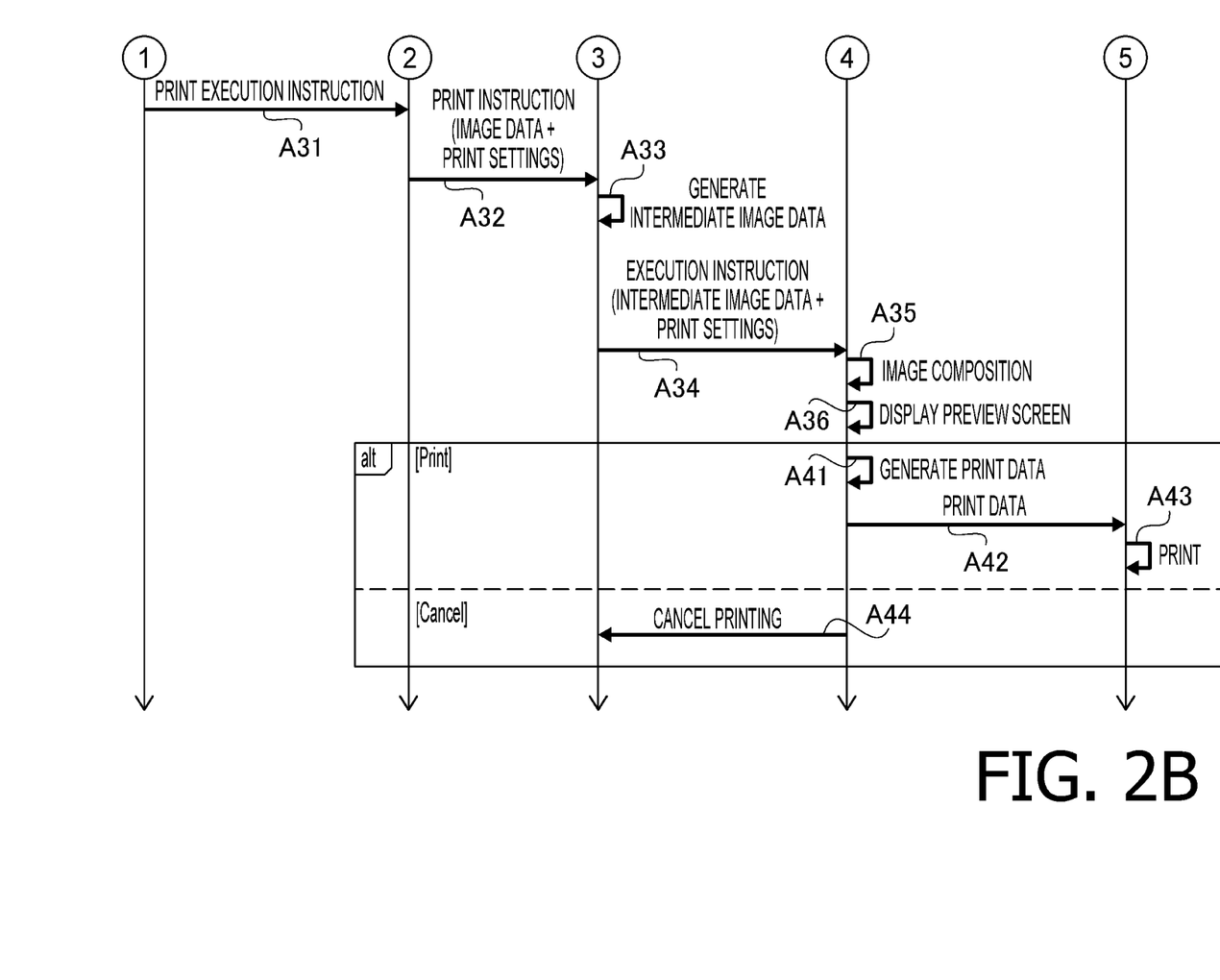

Next, a printing procedure including operations by the auxiliary programs 42 of the illustrative embodiment will be described with reference to sequence charts in FIGS. 2A and 2B. FIGS. 2A and 2B show operations when the PC 1, with the auxiliary programs 42 conforming to the printer 2 incorporated therein, has received a print execution instruction to cause the printer 2 to perform printing using the general-purpose print program 41, with an application (e.g., the edit application 43) to receive a print instruction.

Each processing step in the processes and flowchart(s) in the illustrative embodiment basically indicates processing by the CPU 11 according to instructions described in programs such as the auxiliary programs 42. Processing by the CPU 11 also includes hardware control using an API of the OS 21. In the present disclosure, operations by each program may be described without a detailed explanation of the OS 21. In addition, "obtaining" and "acquiring" may be used as concepts that do not necessarily require a request.

The edit application 43 is configured to accept creating and editing of text, charts, figures, and other information based on user's instructions. In response to receiving an instruction related to printing of currently selected target (e.g., text, a chart, or a figure) (A01), the edit application 43 causes the user I/F 13 to display a print screen for receiving user instructions (A02). For instance, the edit application 43 receives, via the print screen, a print execution instruction, an instruction for basic print settings, and an instruction to start accepting detailed print settings.

When the edit application 43 has received an instruction to start accepting detailed print settings while the printer 2 is selected on the print screen being displayed (A03), the edit application 43 passes information on the received instruction to start accepting detailed print settings to the OS 21. When the OS 21 has received the information on the instruction to start accepting detailed print settings for printing using the general-purpose print program 41, the OS 21 activates the general-purpose print program 41 and provides the instruction to start accepting detailed print settings to the general-purpose print program 41 (A04). In response to receiving the instruction to start accepting detailed print settings, the general-purpose print program 41 provides an execution instruction to accept detailed print settings to the auxiliary programs 42 conforming to the printer 2 as currently selected (A05).

The auxiliary programs 42 start operating based on the execution instruction from the general-purpose print program 41, and cause the user I/F 13 to display a setting screen to receive input operations for detailed print settings (A06). For instance, based on model information on the model of the printer 2, the auxiliary programs 42 cause the user I/F 13 to display a setting screen to receive detailed print settings conformable to the model of the printer 2, and accepts user operations.

Figure 3:
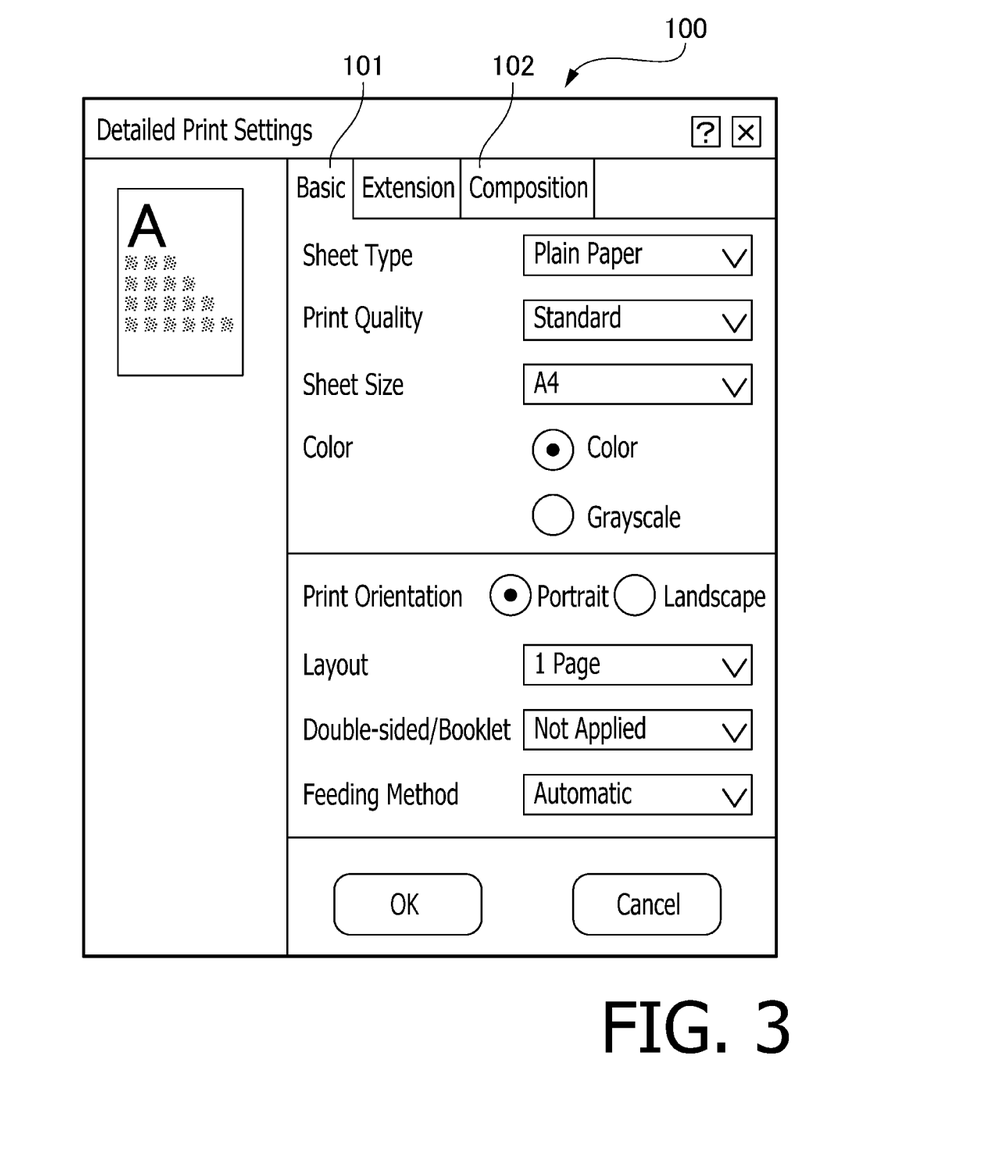
FIG. 3 shows an example of a setting screen.

FIG. 3 shows an example of the setting screen. A setting screen 100 shown in FIG. 3 has a plurality of tabs. The setting screen 100 shown in FIG. 3 is an example screen on which a basic tab 101 for accepting basic print settings is selected. The settings screen 100 has a composition tab 102 for receiving an instruction for image composition to combine an image such as a watermark with a target image to be printed. The instruction for image composition may be accepted not only by operating the composition tab 102 but also by operating an operable member such as a button.

After beginning to display the setting screen 100 in A06, the auxiliary programs 42 send a request for function information to the printer 2 via the communication I/F 14 (A11) and receives the function information from the printer 2 (A12). The function information includes information indicating whether the printer 2 has a sending function to send image information in response to an external request.

The printer 2 in the illustrative embodiment accepts registration of an image for composition, which is to be combined with a print target image and printed as a composite image, in response to an instruction from the PC 1 or through reading from a USB memory. The printer 2 stores the accepted image in a memory of the printer 2. For instance, the printer 2 stores a plurality of types of intermediate image data representing images for watermarks. The printer 2 having the sending function is enabled to send image information indicating images for composition stored in the memory of the printer 2 in response to a request from an external device such as the PC 1.

When having determined that the printer 2 has the sending function to send image information in response to an external request, based on the function information received in A12 (alt: [Having]), the auxiliary programs 42 send a request for image information to the printer 2 (A13) and receive the image information from the printer 2 (A14). The auxiliary programs 42 then store the received image information in the memory 12. In this case, the printer 2 may be an example of an "external device" according to aspects of the present disclosure. If the printer 2 does not have any available images for composition stored therein, the printer 2 may send information indicating that the printer 2 has no image information in response to the request from the auxiliary programs 42 in A14. When the image information is obtained at the timing when the setting screen 100 for accepting detailed print settings is being displayed, it is possible to complete processing after receipt of a print instruction earlier than when the image information is obtained at the timing when the print instruction has been received.

For instance, when the PC 1 is connected with a plurality of printers, the PC 1 may obtain image information registered in a printer that the PC 1 is to cause to perform printing, thereby managing images for composition that are suitable for each printer. The image information sent from the printer may be image data of the images for composition, or may be reduced images (e.g., thumbnail images) representing the images for composition.

The communication between the auxiliary programs 42 and the printer 2 may be performed, for instance, by the auxiliary programs 42 directly communicating with the printer 2 using the MIB ("MIB" is an abbreviation for "Management Information Base") or through the OS 21. When the communication between the auxiliary programs 42 and the printer 2 may be performed via the OS 21, the auxiliary programs 42 and the printer 2 communicate with each other, for instance, according to a communication protocol for the OS 21, such as IPP ("IPP" is an abbreviation for "Internet Printing Protocol").

When having received an instruction for image composition in response to an operation to the composition tab 102 on the setting screen 100 displayed in A06 (A21), the auxiliary programs 42 cause the user I/F 13 to display a selection reception screen for receiving selection of an image for composition (A22). The selection reception screen is configured to accept selection of an image for composition based on the image information obtained from the printer 2. The auxiliary programs 42 may execute A11 to A14 again when having received the instruction for image composition in A21. The auxiliary programs 42 may execute A11 to A14 after receiving the instruction for image composition in A21.

Figure 4:
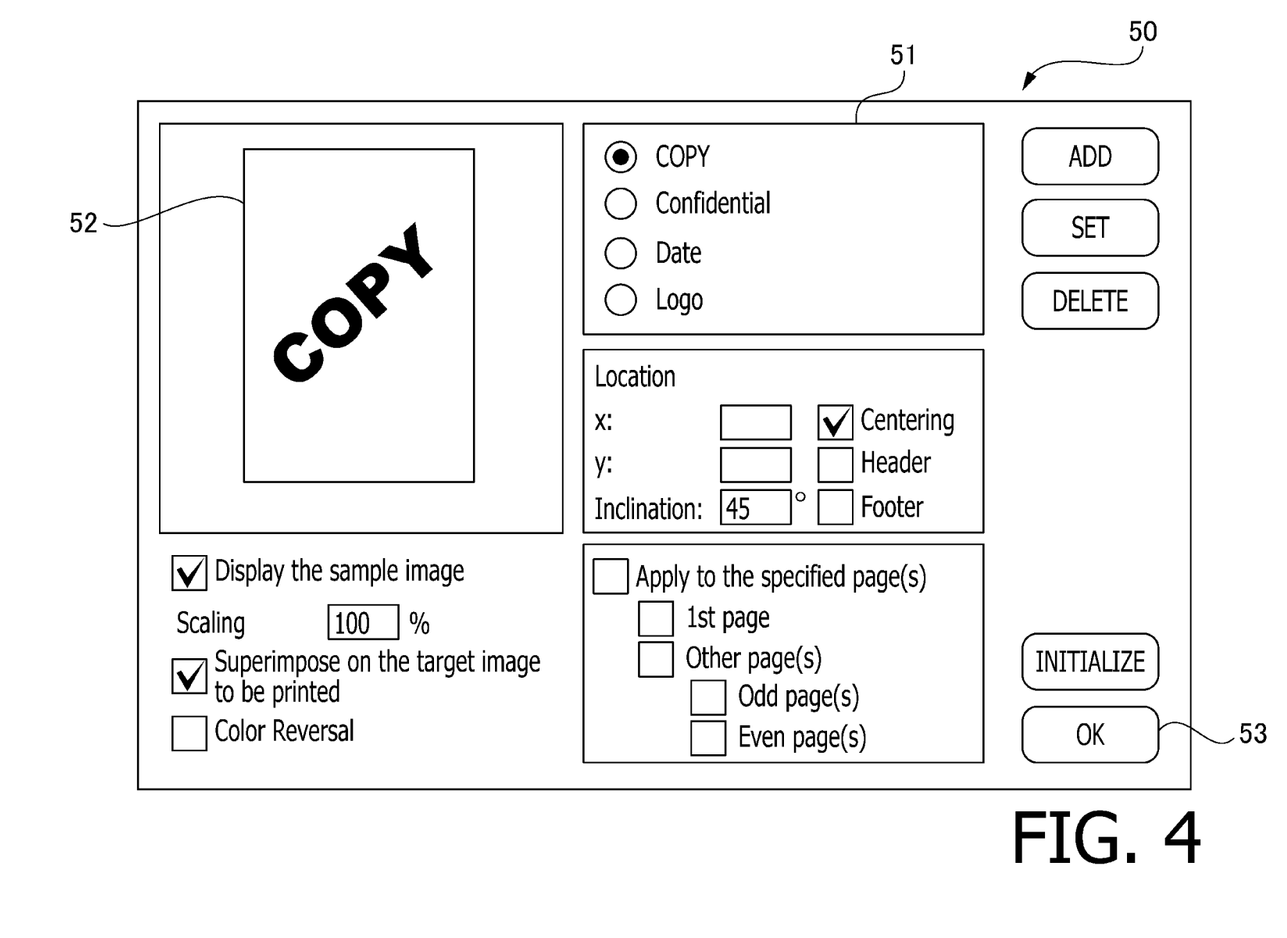
FIG. 4 shows an example of a selection reception screen.

FIG. 4 shows an example of the selection reception screen. A selection reception screen 50 shown in FIG. 4 includes an image-for-composition list 51, a sample image 52, and an OK button 53. In the image-for-composition list 51, a list of the image information obtained from the printer 2 is displayed as a list of images for composition. For instance, names indicating individual images for composition are displayed in a selectable manner in the image-for-composition list 51. The auxiliary programs 42 receive a user's selection instruction via the image-for-composition list 51 shown on the selection reception screen 50 being displayed (A23). Thus, the user is allowed to select an image for composition from among a plurality of pieces of image information via the image-for-composition list 51 on the selection reception screen 50. Therefore, it is possible to increase the degree of freedom for selecting an image for composition and improve the user friendliness.

The auxiliary programs 42 display the sample image 52 based on the image information on an image for composition selected in A23 (A24). The sample image 52 represents a printed image of the selected image for composition. When no image for composition has been selected, the sample image 52 is a blank image. In another instance, as shown in FIG. 4, one of the listed images for composition may be selected and displayed in an initial state of the selection reception screen 50.

The auxiliary programs 42 change the sample image 52 and display the changed sample image 52, in response to a user operation to the selection reception screen 50. When the image for composition is displayed based on the image information received from the printer 2, the user is allowed to more easily grasp the image for composition than when only the name or the thumbnail image of the image for composition is displayed. In the example shown in FIG. 4, it is assumed that only the names of the images for composition are displayed in the image-for-composition list 51. For instance, however, respective sample images (e.g., thumbnail images) of the images for composition may be displayed.

When having received an instruction to terminate the selection of an image for composition in response to an operation to the OK button 53 on the selection reception screen 50 (A25), the auxiliary programs 42 determine the image being selected as the image for composition and close the selection reception screen 50 (A26). The auxiliary programs 42 change the display on the user I/F 13, for instance, back to the basic tab 101 shown in FIG. 3. Then, for instance, when having received an instruction to terminate the detailed settings in response to an operation to the OK button shown in FIG. 3, the auxiliary programs 42 terminate the display of the setting screen 100 and pass the selected print settings and a termination notification to the general-purpose print program 41. The print settings include information regarding image composition. The information regarding image composition includes information specifying the image for composition, and information (e.g., positional information) indicating the form of composition. In response to receiving the termination notification from the auxiliary programs 42, the general-purpose print program 41 passes the termination notification to the edit application 43.

When having determined that the printer 2 does not have the sending function to send the image information in response to an external request, based on the function information received in A12, the auxiliary programs 42 do not perform the processes from A13 to A26. Namely, the auxiliary programs 42 do not accept an instruction for image composition. If the printer 2 does not have the sending function to send the image information, the auxiliary programs 42 are unable to obtain the image information of the image for composition. Therefore, the auxiliary programs 42 omit communication with the printer 2 to obtain the image information and display of the image information. Thereby, a processing load on the auxiliary programs 42 is reduced.

In response to receiving a print execution instruction from the user via the print screen (A31), the edit application 43 provides a print instruction to the general-purpose print program 41 (A32). The general-purpose print program 41 obtains information indicating image data of an image to be printed and information indicating the print settings in the print instruction.

The general-purpose print program 41 generates intermediate image data by converting a format of the image data included in the received print instruction to a format of intermediate image data (A33), and generates a print job including the intermediate image data. The edit application 43 includes various types of image data. The general-purpose print program 41 converts the received image data into intermediate image data suitable for generating print data. If the image data included in the print instruction is suitable for generating print data, the image data may be used as is as the intermediate image data without being converted. For instance, the intermediate image data is XPS data.

The general-purpose print program 41 further provides an execution instruction to the auxiliary programs 42 (A34), and activates the auxiliary programs 42. Through the execution instruction, the generated intermediate image data and information on the print settings are passed to the auxiliary programs 42. When an instruction for image composition is accepted as a print setting, the information on the print settings passed to the auxiliary programs 42 together with the intermediate image data includes, for instance, information specifying the image for composition and information (e.g., positional information) indicating the form of composition, as information regarding image composition.

When the print settings include an instruction for image composition, the auxiliary programs 42 perform image composition processing based on the intermediate image data received in A34 and the information regarding image composition (A35). Specifically, the auxiliary programs 42 read the image information obtained from the printer 2 in A14 from the memory 12 based on the information specifying the image for composition included in the information on the print settings. Further, based on the read image information, the auxiliary programs 42 generate intermediate image data of the image for composition according to the information (e.g., positional information) indicating the form of composition. Moreover, the auxiliary programs 42 combine the generated image for composition with the intermediate image data of the image to be printed. At this time, the image information obtained from the printer 2 may be, for instance, intermediate image data of the image for composition.

The information regarding image composition, which includes the information specifying the image for composition and the information (e.g., positional information) indicating the form of composition, may not be included in the print settings of the general-purpose print program 41. In this case, for instance, when having received the instruction to terminate the selection of the image for composition in A25, the auxiliary programs 42 may store the information regarding image composition for the selected image in the memory 12. Further, in this case, the auxiliary programs 42 may read the information regarding image composition from the memory 12 before the image composition in A35.

Figure 5:
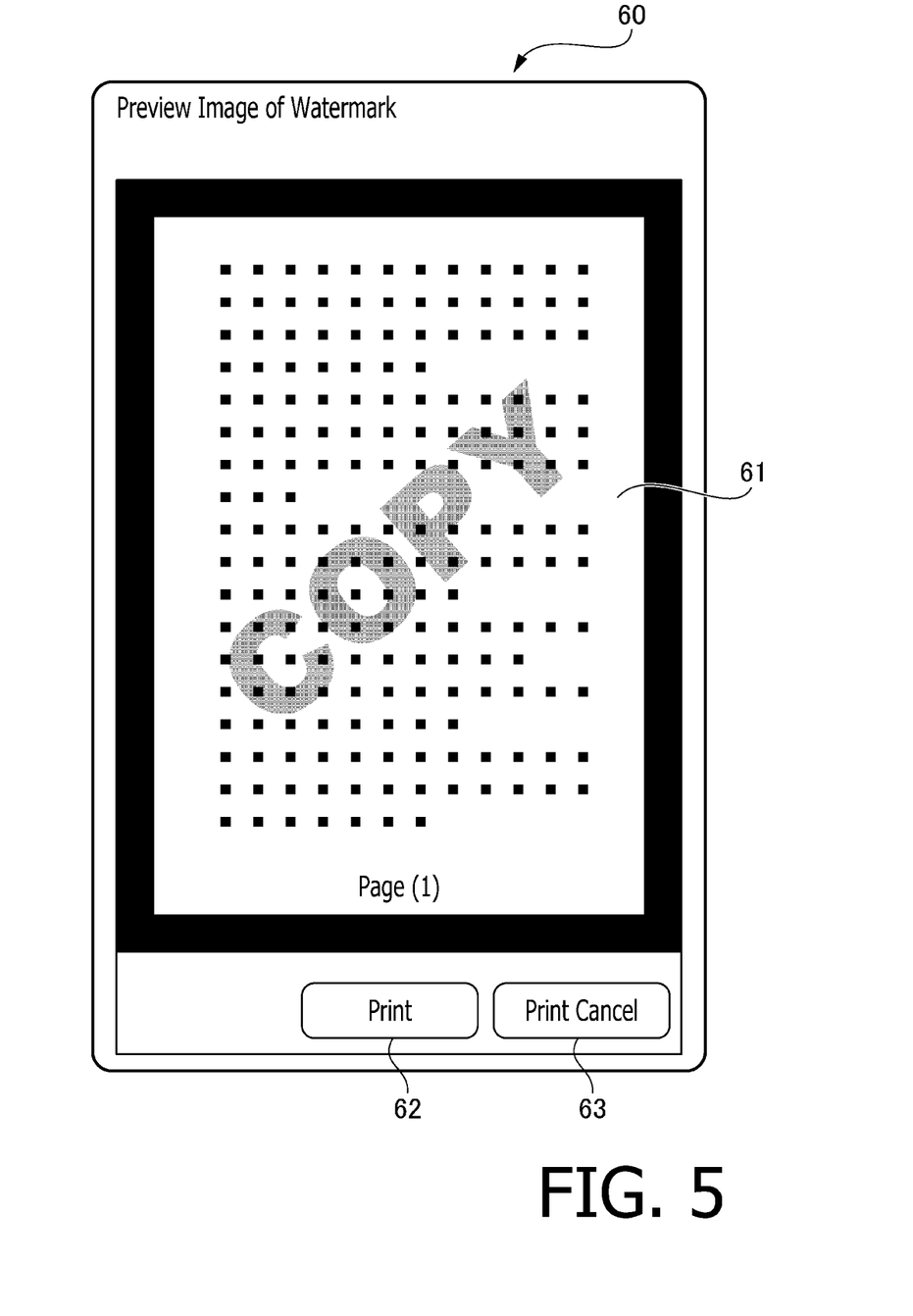
FIG. 5 shows an example of a preview screen.

Furthermore, the auxiliary programs 42 cause the user I/F 13 to display a preview screen for previewing the composite image (A36). FIG. 5 shows an example of the preview screen. The preview screen 60 shown in FIG. 5 includes a preview image 61, a print button 62, and a print cancel button 63. The preview image 61 is an image representing a printed image and resulting from combining a target image to be printed with the selected image for composition. Thus, when the image resulting from combining the target image to be printed with the image for composition is displayed as a sample, the user is allowed to more easily grasp the composite image that will be a printed result than when only the image information before the image composition is displayed.

The auxiliary programs 42 receive an operation to the print button 62 or the print cancel button 63 on the displayed preview screen 60. When having received an instruction to perform printing in response to an operation to the print button 62 (alt: [Print]), the auxiliary programs 42 perform rasterization based on the intermediate image data after the image composition and generate print data indicating the target image to be printed (A41). The print data generated in A41 is data in a format usable for printing by the printer 2, for instance, PDL data dedicated to the model of the printer 2.

When the rasterization is performed by the auxiliary programs 42 conforming to the printer 2, a higher degree of freedom is achieved, and print data suitable for printing by the printer 2 is more likely to be generated, than when the rasterization is performed by the general-purpose print program 41. The print data generated by the auxiliary programs 42 may be in a format usable for printing by printers other than the model of the printer 2.

Instead of the auxiliary programs 42 generating the print data, the general-purpose print program 41 may generate the print data. Namely, when having received an instruction to perform printing, the auxiliary programs 42 may pass information for execution of printing to the general-purpose print program 41. In that case, the auxiliary programs 42 may pass the intermediate image data after image composition and the information for execution of printing to general-purpose print program 41 in A35. The general-purpose print program 41 rasterizes the intermediate image data received from the auxiliary programs 42 to generate print data. The general-purpose print program 41 may then pass the generated print data to the auxiliary programs 42.

The print data generated by the general-purpose print program 41 is print data in a format usable for printing by various types of printers, such as PWG-Raster data or PDF data. When the rasterization is performed by the general-purpose print program 41, the auxiliary programs 42 are responsible for less processing. Therefore, in this case, it is possible to avoid an increase in processing time and to reduce the program size of the auxiliary programs 42.

After generating the print data in A41, the auxiliary programs 42 send the generated print data to the printer 2 together with a print command for instructing the printer 2 to perform printing (A42). If the auxiliary programs 42 receive the print data from the general-purpose print program 41, the auxiliary programs 42 may send the print data received from the general-purpose print program 41 to the printer 2 together with a print command for instructing the printer 2 to perform printing.

The printer 2, which has received the print data and the print command, performs printing of an image represented by the print data based on the received print command (A43). As a result, a printed material is generated. Further, the auxiliary programs 42 notify the general-purpose print program 41 that transmission of the print data has been completed.

The transmission of the print data to the printer 2 may be performed by the general-purpose print program 41. Specifically, for instance, the auxiliary programs 42 may pass the generated print data to the general-purpose print program 41 in such a manner that the print data is to be transmitted from the PC 1 with the printer 2 as the transmission destination. The general-purpose print program 41 may send the print data received from the auxiliary programs 42 to the printer 2. In another instance, the general-purpose print program 41 may generate print data based on the intermediate image data after image composition received from the auxiliary programs 42 and send the generated print data to the printer 2.

The printer 2 in the illustrative embodiment may have a composite function to perform image composition processing. The printer 2 having the composite function performs image composition and printing in response to receiving a composite print command to instruct the printer 2 to perform composite printing. The composite print command includes, for instance, print data representing a target image to be printed and a designation command to specify an image for composition. When having received the composite print command, the printer 2 reads image data of the image for composition specified by the designation command from a memory of the printer 2, combines the read image data with the received print data, and prints the image after the image composition.

If the printer 2 has the composite function, the auxiliary programs 42 may generate the print data of the target image to be printed, instead of generating the print data of the image after image composition. In this case, the auxiliary programs 42 may further send to the printer 2 a composite print command including the generated print data and a designation command to specify the image for composition. If the printer 2 has a rasterizing function, the auxiliary programs 42 may send to the printer 2 a composite print command that includes the intermediate image data of the target image to be printed and a designation command to specify the image for composition, without generating the print data of the target image to be printed.

When the auxiliary programs 42 do not perform image composition processing but send the composite print command to the printer 2, and the printer 2 generates a composite image and prints the generated composite image, the load on the auxiliary programs 42 is reduced. On the other hand, when the auxiliary programs 42 generate a composite image and sends the generated composite image to the printer 2, the printer 2 does not need to perform image composition processing, and the load on the printer 2 is reduced.

To cause a printer to generate a composite image, the auxiliary programs 42 may determine, before obtaining the image information, whether the printer selected as a device to perform printing has a function to generate composite images. For instance, the auxiliary programs 42 may not accept an instruction for image composition as a print setting if the printer does not have the function to generate composite images.

On the other hand, when having received an instruction to cancel printing in response to an operation to the print cancel button 63 on the preview screen 60 (see FIG. 5) displayed in A36 (alt: [Cancel]), the auxiliary programs 42 pass information for canceling the print job to the general-purpose print program 41 (A44). As a result, the general-purpose print program 41 cancels the print job that is based on the print instruction received in A32 and terminates the printing process.

As described in detail above, according to the auxiliary programs 42 in the illustrative embodiment, the PC 1 obtains image information indicating an image for composition that the printer 2 has, and causes the user I/F 13 to display the image for composition indicated by the image information on the selection reception screen 50. Thereby, the user is allowed to grasp the information on the image for composition before providing a print instruction, thus increasing the possibility of avoiding printing that the user does not intend.

Furthermore, in the illustrative embodiment, the images for composition are managed on the printer 2. Therefore, the images for composition are usable by other PCs and devices connected with the printer 2. Accordingly, the images for composition are usable in common by a plurality of PCs.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents.

Examples of the device connected with the PC 1 are not limited to a printer, but may include devices and apparatuses having the printing function, such as multi-function peripherals, copiers, and fax machines. The number of printers connected with the PC 1 is not limited to the example shown in the drawings, but may be two or more.

Figure 6:
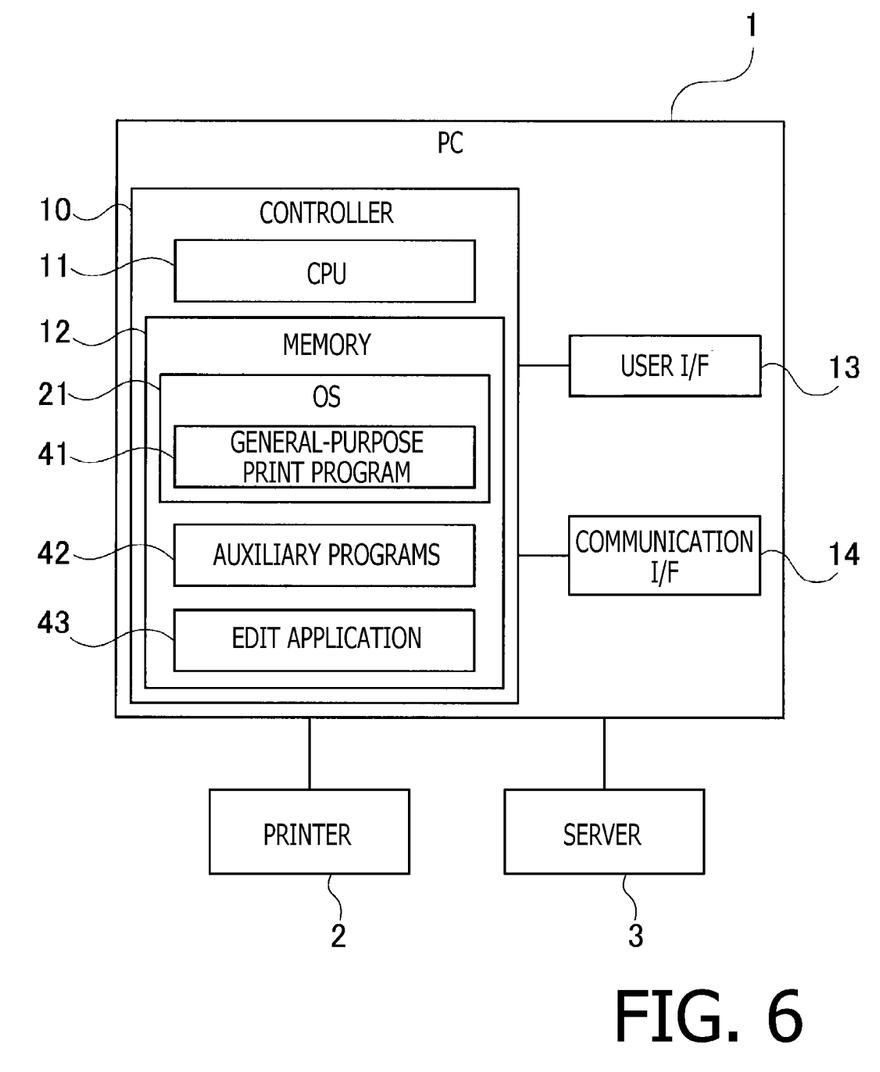
FIG. 6 is a block diagram schematically showing an electrical configuration of a PC.

Examples of the external device are not limited to the printer 2, but may include servers and other devices that are communicably connected with the PC 1. For instance, as shown in FIG. 6, aspects of the present disclosure may be applied to a configuration in which the printer 2 and a server 3 are connected with the PC 1, and the server 3 has information on the images for composition. In this configuration, the auxiliary programs 42 may send substantially the same requests as in A11 and A13 (see FIG. 2A) to the server 3. The server 3 may perform substantially the same processes in A12 and A14 in response to the requests from the PC 1. The auxiliary programs 42 may perform substantially the same processes as in A22 and subsequent steps based on the image information obtained from the server 3, and may accept a user's selection of an image for composition. When the information on the images for composition is managed on the server, the capacity of the memory of the printer may be smaller. Meanwhile, when the information on the images for composition is managed on the printer, the images for composition are usable even in a smaller printing system without a server.

For instance, the auxiliary programs 42 may be configured to obtain the information on the images for composition from a plurality of external devices. For instance, the auxiliary programs 42 may send substantially the same requests as in A11 and A13 (see FIG. 2A) to printers and servers that are connected with the PC 1, and may obtain information on images for composition from each device that has responded to the requests from the PC 1.

The image information that the auxiliary programs 42 obtain from the printer 2 in A14 of FIG. 2A may not be intermediate image data, and may be, for instance, image data in a format that is directly combinable with print data. In this case, the accuracy with which the sample image 52 is displayed is increased. The auxiliary programs 42 may generate the print data and then combine the obtained image data with the generated print data.

The displayed screens as shown in the drawings are all examples. For instance, the respective placements and expressions of individual images and buttons are not limited to the examples shown in the drawings. For instance, on the selection reception screen 50 shown in FIG. 4, the image-for-composition list 51 and the sample images 52 are displayed on a single screen. However, the auxiliary programs 42 may be configured to display the image-for-composition list 51 and the sample images 52 on separate screens. In addition, the auxiliary programs 42 may not display the preview in A36 of FIG. 2B.

In the illustrative embodiment, the auxiliary programs 42 collectively obtain all image information stored in the printer 2 in A14 of FIG. 2A. However, for instance, the auxiliary programs 42 may obtain only information on the name or the thumbnail of the selectable images for composition in A14. In this case, after displaying the selection reception screen and accepting a user's selection of an image for composition via the selection reception screen, the auxiliary programs 42 may obtain the image information of the selected image for composition.

Furthermore, in A11 or A13 of FIG. 2A, the auxiliary programs 42 may make a request for not only the function information or the image information but also, for instance, information about the capability of the printer 2. In that case, the printer 2 may send various types of information in response to the requests. The auxiliary programs 42 may display a screen for receiving user settings based on the various types of information obtained from the printer 2.

In the illustrative embodiment, only the printing operation has been described in detail as an operation by the auxiliary programs 42. However, the auxiliary programs 42 may have other additional roles. The programs for executing the processes in the illustrative embodiment are not limited to the auxiliary programs 42, but may be any programs configured to accept instructions from the OS 21 or the general-purpose print program 41 when printing is performed using the general-purpose print program 41. Examples of the programs for executing the processes according to aspects of the present disclosure may include a print workflow application (Print workflow) of which the specifications have been disclosed by Microsoft Corporation.

The timing at which the auxiliary programs 42 are executed is not limited to the example illustrated in the illustrative embodiment. For instance, the auxiliary programs 42 may be executed directly by an execution instruction from the OS 21, or may be resident programs. When the auxiliary programs 42 are resident programs, the auxiliary programs 42 may perform the aforementioned operations in response to receiving execution instructions.

In any flowchart disclosed in the illustrative embodiment, a plurality of processes in any plurality of steps may be arbitrarily changed in the execution order or may be executed in parallel, to the extent that there is no inconsistency in processing results.

The processes disclosed in the illustrative embodiment may be executed by one or more CPUs, one or more hardware elements such as ASICs, or a combination of at least two elements selected from those elements (including the CPUs and the hardware elements). The processes disclosed in the illustrative embodiment may be implemented in various aspects, such as a method and a non-transitory computer-readable storage medium storing computer-readable instructions for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The controller 10 may be an example of a "controller" according to aspects of the present disclosure. The CPU 11 may be an example of a "computer" according to aspects of the present disclosure. The CPU 11 may be an example of a "processor" according to aspects of the present disclosure. The memory 12 may be an example of a "non-transitory computer-readable storage medium" according to aspects of the present disclosure. The auxiliary programs 42 may be an example of "computer-readable instructions" according to aspects of the present disclosure. The user I/F 13 may be an example of a "user interface" according to aspects of the present disclosure. The edit application 43 may be an example of an "application program" according to aspects of the present disclosure. The general-purpose print program 41 may be an example of a "general-purpose print program" according to aspects of the present disclosure. The printer 2 and the server 3 may be included in examples of an "external device" according to aspects of the present disclosure.

What is claimed is:

1. A non-transitory computer-readable storage medium storing computer-readable instructions that are executable by a computer of an information processing device and conform to a printer connected with the information processing device, the instructions supporting a general-purpose print program incorporated in an operating system of the information processing device, the instructions being configured to, when executed by the computer, cause the information processing device to:

obtain a plurality of pieces of image information from an external device connected with the information processing device, each piece of image information indicating an image for composition registered in the external device;

cause a user interface of the information processing device to display the obtained plurality of pieces of image information;

receive, via the user interface, selection of one piece of image information from among the obtained plurality of pieces of image information;

cause the user interface to display the selected one piece of image information; and perform a printing process to cause the printer to print a composite image in which the image for composition indicated by the selected one piece of image information is combined with a target image to be printed, in response to a print instruction with a print setting for image composition being output from an application program incorporated in the information processing device to the general-purpose print program.

2. The non-transitory computer-readable storage medium according to claim 1, wherein the instructions are further configured to, when executed by the computer, cause the information processing device to:

cause the user interface to display a setting screen configured to receive input operations for print settings; and obtain the plurality of pieces of image information from the external device connected with the information processing device, based on the setting screen being displayed.

3. The non-transitory computer-readable storage medium according to claim 1, wherein the instructions are further configured to, when executed by the computer, cause the information processing device to:

in response to the print instruction with the print setting for image composition being output from the application program to the general-purpose print program, cause the user interface to display the composite image in which the image for composition indicated by the selected one piece of image information is combined with the target image to be printed, before performing the printing process.

4. The non-transitory computer-readable storage medium according to claim 1, wherein the instructions are further configured to, when executed by the computer, cause the information processing device to cause the user interface to display the image for composition indicated by the selected one piece of image information.

5. The non-transitory computer-readable storage medium according to claim 1, wherein the printing process includes:

generating image data of the composite image; and sending the generated image data of the composite image to the printer, thereby causing the printer to print the composite image in response to receiving the image data of the composite image.

6. The non-transitory computer-readable storage medium according to claim 1, wherein the printing process includes sending, to the printer, a designation command to specify the image for composition indicated by the selected one piece of image information, and image data of the target image to be printed that is indicated by the print instruction, thereby causing the printer to:

generate the composite image in which the image for composition specified by the designation command is combined with the target image to be printed that is indicated by the print instruction; and print the generated composite image.

7. The non-transitory computer-readable storage medium according to claim 1, wherein the instructions are further configured to, when executed by the computer, cause the information processing device to obtain the plurality of pieces of image information from the printer that is the external device connected with the information processing device.

8. The non-transitory computer-readable storage medium according to claim 7, wherein the instructions are further configured to, when executed by the computer, cause the information processing device to:

obtain function information indicating whether the printer has a sending function to send image information;

when the obtained function information indicates that the printer has the sending function, obtain the plurality of pieces of image information from the printer and cause the user interface to display the obtained plurality of pieces of image information; and when the obtained function information indicates that the printer does not have the sending function, perform neither obtaining the plurality of pieces of image information from the printer nor causing the user interface to display the plurality of pieces of image information.

9. The non-transitory computer-readable storage medium according to claim 1, wherein the selected image information is displayed in a first display process which causes the user interface to display the image for composition indicated by the selected one piece of image information, and wherein the instructions are further configured to, when executed by the computer, cause the information processing device to:

in response to the printing instruction with the print setting for image composition being output from the application program to the general-purpose print program, obtain image data of the target image to be printed from the general-purpose print program, and perform a second display process to cause the user interface to display a preview of the composite image in which the image for composition indicated by the selected one piece of image information is combined with the target image indicated by the image data obtained from the general-purpose print program, before sending print data of the composite image to the printer to cause the printer to print the composite image.

10. An information processing device comprising:

a user interface; and a controller including:

a processor; and a non-transitory computer-readable storage medium storing an application program, a general-purpose print program incorporated in an operating system of the information processing device, and computer-readable instructions conforming to a printer connected with the information processing device and supporting the general-purpose print program, the instructions being configured to, when executed by the processor, cause the controller to:

obtain a plurality of pieces of image information from an external device connected with the information processing device, each piece of image information indicating an image for composition registered in the external device;

cause the user interface to display the obtained plurality of pieces of image information;

receive, via the user interface, selection of one piece of image information from among the obtained plurality of pieces of image information;

cause the user interface to display the selected one piece of image information; and perform a printing process to cause the printer to print a composite image in which the image for composition indicated by the selected one piece of image information is combined with a target image to be printed, in response to a print instruction with a print setting for image composition being output from the application program to the general-purpose print program.

11. A method implementable by a processor executing computer-readable instructions on an information processing device, the instructions conforming to a printer connected with the information processing device and supporting a general-purpose print program incorporated in an operating system of the information processing device, the method comprising:

obtaining a plurality of pieces of image information from an external device connected with the information processing device, each piece of image information indicating an image for composition registered in the external device;

causing a user interface of the information processing device to display the obtained plurality of pieces of image information;

receiving, via the user interface, selection of one piece of image information from among the obtained plurality of pieces of image information;

causing the user interface to display the selected one piece of image information; and performing a printing process to cause the printer to print a composite image in which the image for composition indicated by the selected one piece of image information is combined with a target image to be printed, in response to a print instruction with a print setting for image composition being output from an application program incorporated in the information processing device to the general-purpose print program.

12. A non-transitory computer-readable storage medium storing computer-readable instructions that are executable by a computer of an information processing device and conform to a printer connected with the information processing device, the instructions supporting a general-purpose print program incorporated in an operating system of the information processing device, the instructions being configured to, when executed by the computer, cause the information processing device to:

obtain image information from an external device connected with the information processing device, the image information indicating an image for composition registered in the external device;

cause a user interface of the information processing device to display the obtained image information; and perform a printing process to cause the printer to print a composite image in which the image for composition indicated by the obtained image information is combined with a target image to be printed, in response to a print instruction with a print setting for image composition being output from an application program incorporated in the information processing device to the general-purpose print program, wherein the printing process includes sending, to the printer, a designation command to specify the image for composition indicated by the image information, and image data of the target image to be printed that is indicated by the print instruction, thereby causing the printer to:

generate the composite image in which the image for composition specified by the designation command is combined with the target image to be printed that is indicated by the print instruction; and print the generated composite image.

13. A non-transitory computer-readable storage medium storing computer-readable instructions that are executable by a computer of an information processing device and conform to a printer connected with the information processing device, the instructions supporting a general-purpose print program incorporated in an operating system of the information processing device, the instructions being configured to, when executed by the computer, cause the information processing device to:

obtain function information indicating whether the printer has a sending function to send image information, the image information indicating an image for composition registered in the printer;

when the obtained function information indicates that the printer has the sending function, obtain the image information from the printer connected with the information processing device, cause a user interface of the information processing device to display the obtained image information and perform a printing process to cause the printer to print a composite image in which the image for composition indicated by the obtained image information is combined with a target image to be printed, in response to a print instruction with a print setting for image composition being output from an application program incorporated in the information processing device to the general-purpose print program, and when the obtained function information indicates that the printer does not have the sending function, perform neither obtaining the image information from the printer nor causing the user interface to display the image information.

* * * * *